US007959131B2

(12) United States Patent
Easley et al.

(10) Patent No.: US 7,959,131 B2
(45) **Date of Patent: *Jun. 14, 2011**

(54) DEFLECTION SENSING SYSTEM

(75) Inventors: James B. Easley, Orono, MN (US); Gerald W. Grabowski, Plymouth, MN (US); Donald G. Dalland, Mantorville, MN (US); Doug Tvedt, Owatonna, MN (US)

(73) Assignee: Zareba Security, Inc., Plymouth, MN (US)

(*) Notice: Subject to any disclaimer, the term of this patent is extended or adjusted under 35 U.S.C. 154(b) by 497 days.

This patent is subject to a terminal disclaimer.

(21) Appl. No.: 11/937,257

(22) Filed: Nov. 8, 2007

(65) Prior Publication Data

US 2008/0074257 A1 Mar. 27, 2008

Related U.S. Application Data

(63) Continuation of application No. 10/840,341, filed on May 5, 2004, now Pat. No. 7,339,474.

(60) Provisional application No. 60/468,400, filed on May 6, 2003, provisional application No. 60/558,338, filed on Mar. 30, 2004.

(51) Int. Cl.
*A01K 3/00* (2006.01)
*G08B 13/00* (2006.01)

(52) U.S. Cl. ............... 256/10; 256/1; 340/541; 340/548

(58) Field of Classification Search ................ 256/1, 10; 200/61.93; 340/426.24, 541, 548, 564
See application file for complete search history.

(56) References Cited

U.S. PATENT DOCUMENTS

| | | | | |
|---|---|---|---|---|
| 2,780,689 | A | 2/1957 | La Cavera | |
| 3,450,852 | A | 6/1969 | Rhodes | |
| 3,634,638 | A * | 1/1972 | Even-Tov et al. | 200/61.93 |
| 4,367,459 | A | 1/1983 | Amir et al. | |
| 4,583,084 | A | 4/1986 | Henderson et al. | |
| 4,683,356 | A | 7/1987 | Stoler | |
| 4,829,287 | A | 5/1989 | Kerr et al. | |
| 5,103,207 | A | 4/1992 | Kerr et al. | |
| 5,578,990 | A | 11/1996 | Sanford, Jr. et al. | |
| 5,602,534 | A | 2/1997 | Granat | |
| 5,900,815 | A | 5/1999 | Story | |
| 6,578,438 | B2 | 6/2003 | Steinberg et al. | |
| 7,339,474 | B2 * | 3/2008 | Easley et al. | 340/548 |
| 2005/0017230 | A1 | 1/2005 | Easley et al. | |

FOREIGN PATENT DOCUMENTS

WO WO0033273 A1 6/2000

* cited by examiner

*Primary Examiner* — Victor MacArthur
(74) *Attorney, Agent, or Firm* — Jacobson Holman PLLC

(57) ABSTRACT

The system incorporates wire deflection, taut wire detection for perimeter security applications. Generally, the system of the invention provides intrusion detection by an internal mechanism. The internal mechanism can detect wire deflection in any direction. In turn, given a sufficient amount of wire deflection, a security system is signaled. However, the force required to sufficiently deflect the wires is high enough so as to minimize nuisance alarms. The internal mechanism is generally held within a structure so that it is protected from tampering. As such, the internal mechanism is also kept separate from the wire array so that it is protected from attempts by an intruder to isolate the wire array.

18 Claims, 7 Drawing Sheets

DEFLECTION SENSING SYSTEM

CROSS REFERENCE TO RELATED APPLICATIONS

The present application is a continuation application of U.S. application Ser. No. 10/840,341, filed May 5, 2004 now U.S. Pat. No. 7,339,474, which claims priority to U.S. provisional applications No. 60/468,400, filed May 6, 2003, and No. 60/558,338 filed Mar. 30, 2004, the disclosures of which are incorporated herein by reference.

FIELD OF THE INVENTION

The invention relates to an apparatus and method for providing perimeter security. More particularly, the invention relates to physical perimeter barriers, and more specifically, the present invention relates to intrusion detection and deterrence systems for the physical perimeter barriers.

BACKGROUND OF THE INVENTION

In providing perimeter security, one can currently choose from many systems available in the world marketplace. One such system includes non-lethal electric fencing (NLEF). NLEF systems provide significant deterrence value and provide low incidences of false or nuisance alarms; however, they generally provide less detection value than other systems. NLEF systems function by monitoring change in fence voltage, for example, a sharp decrease in voltage that may occur if someone were to touch a fence wire while standing on the ground. However, if someone were insulated from the voltage, there generally would be no corresponding decrease in voltage, and thus, no detection that an intruder or escapee were penetrating the barrier. For example, if an intruder or escapee were to electrically isolate himself from the NLEF by using a plastic container or electrically insulated clothing, he would be able to spread or climb fence wires without detection.

Another system includes taut wire fencing. While taut wire systems provide low incidences of false or nuisance alarms and very good detection value of an intruder or escapee attempting to spread or climb a wire, they generally fail to provide much deterrence value as most are not electrified. Also, taut wire systems are generally among the most expensive perimeter security systems available because of the use of complex strain gauges, sophisticated electronics, or sensitive transducers to measure and detect tension changes in the wire array. In addition, complex algorithms are generally required to maintain tension on each wire because environmental factors cause wires to gradually expand and contract, causing tension on individual wires to vary over time. According to one industry expert, a taut wire sensor post can cost as much as $29,000 and a taut wire system can cost $150-$170 per foot to install.

Other systems may use special "profile" posts that create a path to ground if fence wires are spread. As such, if the wires are spread far enough apart, they come in contact with these special posts, cause a short-circuit, and in turn, an alarm will sound. The problem with these specialized, grounded posts is that they require the use of the wire array to be part of the detection system for wire spreading. As a result, they are often easily defeatable. The point of contact between the high voltage electric fence wire and the special post is exposed and can easily be insulated or tampered with by an intruder/escapee. These systems also require that electricity be flowing in the fence wire array, which is not desired by some users.

It should be appreciated that a large number of other fencing systems exist in addition to those described above; however, these descriptions are provided to demonstrate that there are advantages and disadvantages with using any system. As such, in an attempt to address certain shortcomings of these systems as well as others, the system of the invention is provided.

SUMMARY OF THE INVENTION

Certain embodiments of the invention provide a fencing system for providing perimeter security. The fencing system comprises one or more posts positioned along a perimeter, where at least one of the posts includes one or more cabinets. The system also includes one or more strands of fencing wire operatively coupled to the posts, where each strand of fencing wire operatively connects the posts, with the posts and fencing wire strands outlining the perimeter. The system also includes at least one sensing mechanism operatively coupled to one of the cabinets, where the sensing mechanism includes a deflection bar having an arm portion protruding out from the cabinet and a contact portion within the cabinet. The deflection bar arm portion is operatively coupled to one of the strands of fencing wire, and the deflection bar contact portion is configured to complete an electrical circuit if the strand of fencing wire coupled to the deflection bar arm portion is deflected with a sufficient amount of force. The completion of the electrical circuit triggers an alarm condition. The electrical circuit includes a first bus bar and a second bus bar proximate to the sensing mechanism, with the first bus bar being electrically charged and the second bus bar being electrically grounded. The electrical circuit completion involves the first bus bar and the second bus bar being electrically connected.

Additionally, certain embodiments of the invention provide a fencing system for providing perimeter security. The fencing system comprises one or more cabinets. The system also includes one or more strands of fencing wire operatively coupled to the cabinets, where each strand of fencing wire operatively connects the cabinets, with the cabinets and fencing wire strands outlining the perimeter. The system also includes at least one sensing mechanism operatively coupled to one of the cabinets, where the sensing mechanism includes a deflection bar having an arm portion protruding out from the cabinet and a contact portion within the cabinet. The deflection bar arm portion is operatively coupled to one of the strands of fencing wire, and the deflection bar contact portion is configured to complete an electrical circuit if the strand of fencing wire coupled to the deflection bar arm portion is deflected with a sufficient amount of force. The completion of the electrical circuit triggers an alarm condition.

Additionally, certain embodiments of the invention provide a fencing system for providing perimeter security. The fencing system comprises one or more posts positioned along a perimeter, where at least one of the posts includes one or more cabinets. The system also includes one or more strands of fencing wire operatively coupled to the posts, where each strand of fencing wire is operatively connecting the posts, with the posts and fencing wire strands outlining the perimeter. The system also includes at least one means for sensing operatively coupled to one of the cabinets, where the means for sensing is operatively coupled to one of the wire strands. The means for sensing triggers an alarm condition if the strand of wire coupled to the means for sensing is deflected with a sufficient amount of force.

Also, certain embodiments of the invention provide a method of providing perimeter security. The method comprises positioning one or more posts along a perimeter, where at least one of the posts includes one or more cabinets. The method also includes operatively coupling one or more strands of fencing wire to the posts, where each strand of fencing wire operatively connects the posts, with the posts and fencing wire strands outlining the perimeter. The method additionally comprises providing at least one sensing mechanism, where the sensing mechanism includes a deflection bar having an arm portion protruding out from the cabinet and a contact portion within the cabinet, with the deflection bar arm portion adapted to couple with one of the strands of fencing wire. The method further includes coupling operatively the deflection bar arm portion of the at least one sensing mechanism to one of the strands of fencing wire. The method also includes coupling operatively the sensing mechanism to one of the cabinets of one of the posts with the contact portion configured to complete an electrical circuit if the deflection bar arm portion is deflected with a sufficient amount of force, where the completion of the electrical circuit triggers an alarm condition. The method further includes providing the electrical circuit to include a first bus bar and a second bus bar proximate to the sensing mechanism, where the first bus bar is electrically charged and the second bus bar is electrically grounded, with the electrical circuit completion involving the first bus bar and the second bus bar being electrically connected.

DETAILED DESCRIPTION OF THE PREFERRED EMBODIMENT

Figure 1:
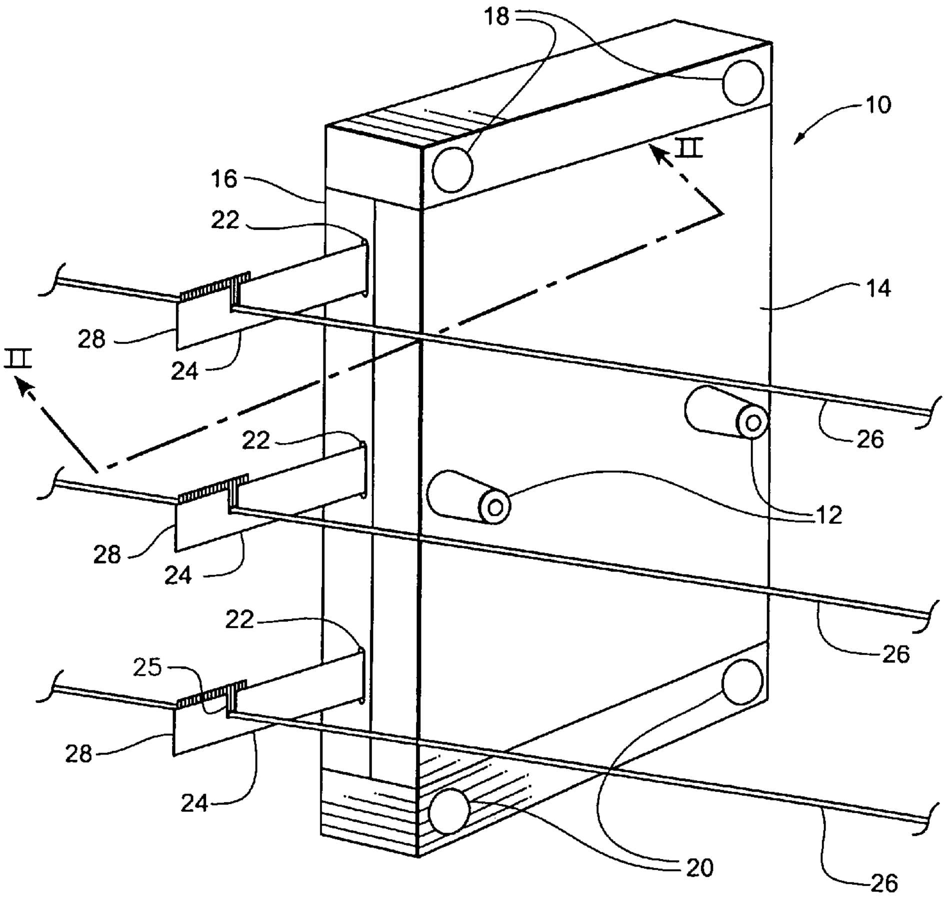
FIG. 1 illustrates a schematic side perspective view of a cabinet of a sensor post in accordance with certain embodiments of the invention.

The following detailed description is to be read with reference to the drawings, in which like elements in different figures have like reference numerals. The drawings, which are not necessarily to scale, depict selected embodiments, but are not intended to limit the scope of the invention. It will be understood that many of the specific details of the device incorporating the system illustrated in the drawings could be changed or modified by one of ordinary skill in the art without departing significantly from the spirit of the invention. For example, the deflection sensing system is designed for use on fences, however it may be used on other barriers as well.

The system of the invention has wide applicability in providing perimeter security. It can be used in a variety of applications where deterrence, detection, and/or delay are required to protect assets. Such applications include government, commercial, industrial, and private settings. Generally, the invention is applicable to any type of fencing array and can be used with wire strands of any size. In certain embodiments, the system incorporates wire deflection, taut wire detection in fence line post systems. As such, a reliable mechanical process can be employed to activate an alarm condition based on wire deflection. Generally, the system provides intrusion detection by an internal mechanism that can detect wire deflection in any direction. In turn, given a sufficient amount of wire deflection, for example, from an intruder attempting to spread or climb a wire array, a security system is signaled. However, the force threshold can be set high enough so as to minimize nuisance alarms that might be caused by birds, animals, or other environmental factors.

In certain embodiments of the invention, a fence system is provided. In some of these embodiments, the fence system includes one or more fence posts 13 (see FIG. 7). The fence posts are preferably Guard Tower™ sensor posts, which are commercially available from Zareba Systems (Ellendale, Minn., U.S.A.). In certain embodiments of the invention, one end of each fence post is mounted on or in the ground such that the post stands in a vertical orientation. However, the posts can also be used in angular orientations, such that they are incorporated at a variety of angles from the ground. Additionally, the posts may not be mounted in the ground, but instead mounted on roofs or wall tops. Further, the posts can be mounted to existing posts.

In certain embodiments of the invention, one or more of the fence posts is preferably constructed with one or more heavy-duty, impact resistant cabinets. Preferably, these cabinets are formed of a hardy material, e.g., plastic. Each cabinet is designed to provide for electrical isolation, environmental protection, and vandal resistance. Such a cabinet 10 is shown in FIG. 1. Preferably, each cabinet 10 has one or more mounting bosses 12 which permit the cabinet 10 to be mounted to existing fences posts. As illustrated, an embodiment of one cabinet 10 may include two mounting bosses 12 being located on each major side 14, 16 of the cabinet 10 (only one major side is visibly shown).

In certain embodiments, each cabinet 10 additionally defines an upper set of screw holes 18 and a lower set of screw holes 20. As shown, each set 18 and 20 can include two screw holes. To form a fence post consisting of two or more cabinets 10 stacked vertically, each of the cabinets 10 are fastened together by utilizing the upper and lower sets of screw holes 18, 20. In certain embodiments of the invention, the lower set of screw holes 20 from one cabinet slides over the upper set of screw holes 18 from the other cabinet, and fasteners (not shown) are subsequently disposed through the adjoined screw holes 18, 20 to secure the cabinets together. This process is repeated with additional cabinets 10 to enable the post to be extended to any length required by the user.

In certain embodiments, each cabinet 10 also defines one or more slots 22. As illustrated, the cabinet 10 may include three slots 22, each retaining a deflection bar 24. These slots 22 provide a pivot point for the deflection bar 24. In certain embodiments, the slots 22 are vertically aligned, with equidistant spacing between adjacent slots 22. Optimally, the adjacent slots 22 would be spaced four inches apart. However, in other embodiments of the invention, the spacing of the slots 22 may be configured otherwise to meet user requirements. In certain embodiments, the deflection bars 24 are constructed of a metallic material to provide for vandal resistance. In certain embodiments, the length of the deflection bar 24 protruding outside the cabinet 10 is preferably at least about four inches, perhaps more preferably at least about eight inches, and perhaps optimally at least about twelve inches.

One or more strands of fencing wire 26 (forming a wire array) are accommodated by each fence post. These wire strands are strung from post to post such that they extend in a horizontal orientation, however this horizontal orientation can be angularly varied as described above in relation to the fence posts. In certain preferable embodiments of the invention, each strand of fence wire 26 would be operatively coupled to one of the deflection bars 24 protruding from one of the cabinets 10 of the fence post. Each deflection bar 24 preferably has an outer end 28 adapted to retain the individual wire strand 26 passed therethrough. In certain embodiments, each deflection bar 24 can be configured to define a slot 25 that holds the individual wire strand 26.

The wire strands 26 are kept preferably taut, and not loose or wobbly. Consequently, when installed in the field, the wire strands 26 (for taut fence types) strung from post to post are tested using a compression spring technique which ensures that the strands have a certain tautness. This technique is well known to those skilled in the art. Due to this tautness, a deflection of any one wire strand 26 in any direction can be detected, and preferably, detected via one of the cabinets 10. While the fence system can be made highly sensitive to deflections in the wire strands 26, by providing adjustability in regard to detection level, the system can also be set so that it is minimally affected by nuisances or false alarms caused by birds, small animals, plant life (e.g., contact made from plant life growing into or moving in contact with), or weather.

In certain embodiments of the invention, the one or more cabinets 10 of each fence post are able to detect the deflection of any of the accommodated wire strands 26 through a sensing mechanism (not visible in FIG. 1) that is operatively coupled to the cabinet 10. Generally, a deflection in any wire strand 26 will occur when the strands 26 are pulled or pushed. In turn, the deflection bar 24 retaining the wire strand 26 will be deflected in some fashion. The force causing the deflection of the deflection bar 24, if significant enough, will activate the sensing mechanism, and will result in an alarm condition.

Figure 2:
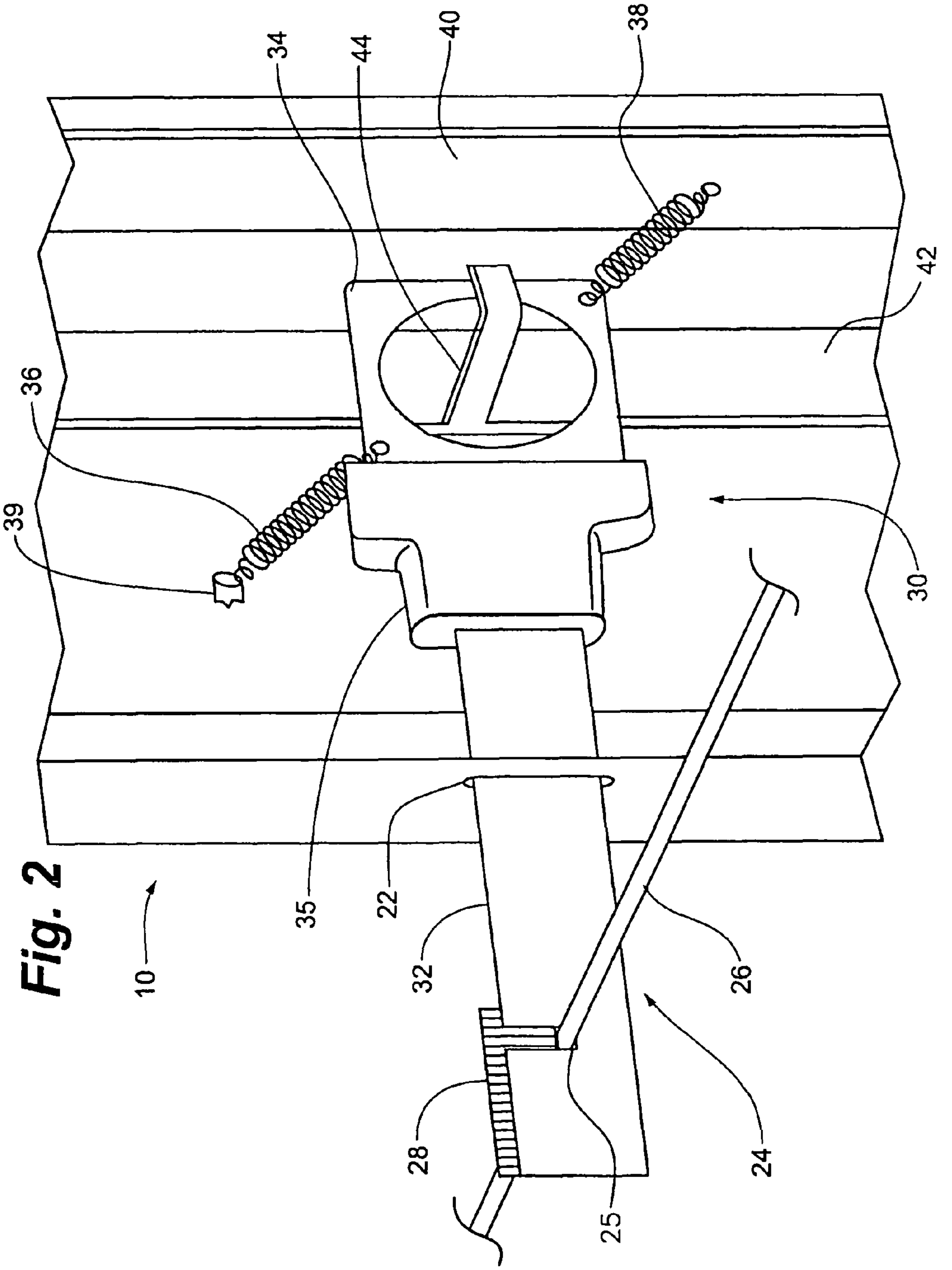
FIG. 2 illustrates a schematic side cross sectional view of the cabinet of FIG. 1 and a schematic side perspective view of a deflection sensing mechanism in accordance with certain embodiments of the invention.

As described above, the sensing mechanism functions with the deflection bars 24 of the fence post. In particular, FIG. 2 illustrates one such mechanism 30 in accordance with certain embodiments of the invention. The sensing mechanism 30 includes at least one of the deflection bars 24. The deflection bar 24 is adapted to pivot in the slot 22 in the cabinet 10. As depicted, the deflection bar 24 has an arm portion 32 protruding from the cabinet 10 and a contact portion 34 within the cabinet 10. As illustrated, a non-conductive collar 35 interconnects the arm portion 32 and the contact portion 34 of the deflection arm 24. In certain embodiments, the collar 35 is made of plastic. In certain embodiments, the deflection bar contact portion 34 is held in place by springs, with at least one front spring 36 and at least one rear spring 38. The front spring 36 is further connected to a support post 39. The rear spring 38 is further connected to a first bus bar 40. In certain embodiments, as illustrated, the first bus bar 40 is proximate to the rear of the cabinet 10. As such, the first bus bar 40 is referenced herein as the rear bus bar, but the invention should not limited as such. In certain embodiments of the invention, the rear bus bar 40 is electrically charged, and in turn, electrically charges the deflection bar contact portion 34 via the spring 38.

A second bus bar 42 is also included in the system. In certain embodiments, as illustrated, the second bus bar 42 is proximate to the side of the cabinet 10. As such, the second bus bar 42 is referenced herein as the side bus bar, but the invention should not limited as such. The side bus bar 42 is electrically grounded, and as such, can provide a ground reference for the rear bus bar 40. In certain embodiments, the side bus bar 42 includes one or more protrusions 44. The protrusion 44 protrudes through the middle of the deflection bar contact portion 34, and is preferably bent at an angle. In certain preferred embodiments of the invention, one such protrusion 44 exists for every slot 22 located in the cabinet 10, and each of the protrusions 44 are vertically spaced so as to correspondingly align with each of the slots 22.

In reference to the above-described embodiments, the deflection bar arm portion 32, the deflection bar contact portion 34, the springs 36 and 38, the rear bus bar 40, and the side bus bar 42 are all made from a conductive, corrosion-resistant metallic material (e.g., brass). As mentioned, the collar 35 is made from an insulating material (e.g., plastic) in order to electrically isolate the fence wire strand 26 from any electrical charge that comes in contact with the deflection bar contact portion 34. As such, the collar 35 also provides isolation for the deflection bar contact portion 34 from any voltage that may be placed on the wire strand 26. In addition, the rear and side bus bars 40, 42 are referenced as such because of their function as electrical conductors. They should not be identified as or confused with data communication buses, or the functioning of data communication buses.

In use, when one of the fence wire strands 26 is deflected, the corresponding deflection bar 24 that accommodates the deflected wire strand 26 (via the deflection bar arm portion 32) subsequently pivots in its corresponding slot 22. If the wire strand 26 is sufficiently deflected, the deflection bar 24 will in turn be pivoted with enough force for the deflection bar contact portion 34 to contact the side bus bar 42 or the protrusion 44 protruding from it. When this contact occurs, an electric circuit is completed, causing the alarm condition. Each of the protrusions 44 of the side bus bar 42 are configured such that regardless of the deflection of the wire strand 26 (e.g., in/out, up/down, side/side), the deflection bar contact portion 34 will contact the protrusion 44 or the side bus bar 42, provided that a sufficient amount of force is applied.

In other embodiments of the invention, the side bus bar 42 may be electrically charged, while the rear bus bar 40 provides the ground reference. It is irrelevant which bus bar 40 or 42 is electrically charged as long as the other bus bar provides the appropriate ground reference. Also, the detection level of the system could be varied by replacing the front and rear springs 36, 38. For example, if the detection level needed to be reduced (i.e., allowing a lesser deflection of the wire strand 26 to cause an alarm condition), the springs 36, 38 could be replaced by smaller springs which would enable easier pivoting of the deflection bar contact portion 34 and subsequent signaling of the alarm condition. In contrast, if the detection level needed to be increased (i.e., requiring a greater deflection of the wire strand 26 to cause an alarm condition), the springs 36, 38 could be replaced by larger springs which would create more resistance to pivoting the deflection bar contact portion 34 and subsequent signaling of the alarm condition. In certain embodiments, the deflection bar 24 is constructed (e.g., without the collar 35) such that the user has the option to electrically charge the wire array.

Figure 3:
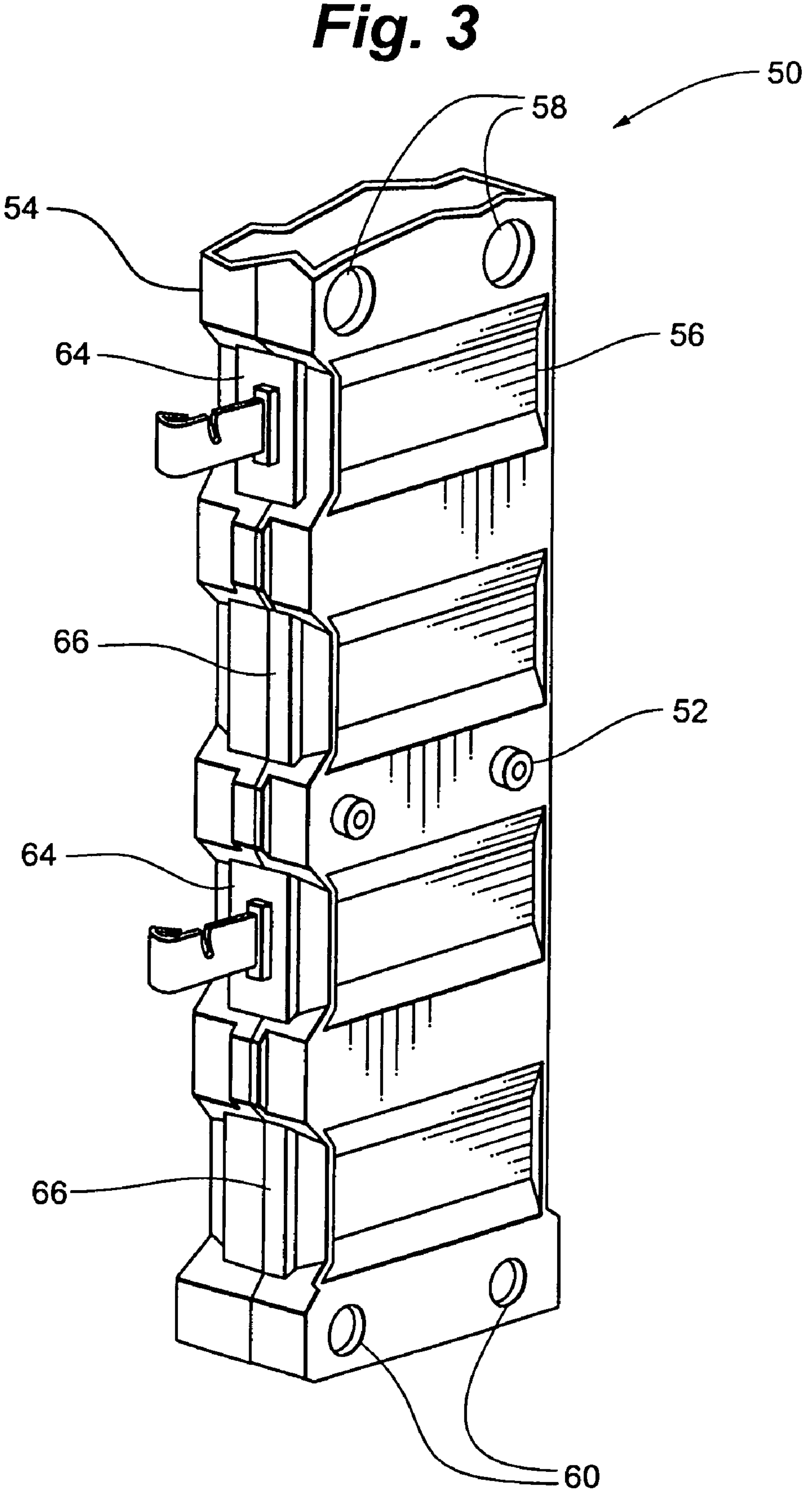
FIG. 3 is a computer aided drawing illustrating a schematic side perspective view of an alternate cabinet of a sensor post in accordance with certain embodiments of the invention.

An alternate cabinet is shown in FIG. 3. Similar to the cabinet 10 illustrated in FIGS. 1 and 2, the alternate cabinet 50 is impact resistant, preferably formed of a hardy material, e.g., plastic. As such, the cabinet 50 provides for electrical isolation, environmental protection, and vandal resistance. In certain embodiments, the cabinet 50 also includes one or more mounting bosses 52 on each of its major sides 54, 56 as well as an upper set of screw holes 58 and a lower set of screw holes 60. The bosses 52 and the screw holes 58 and 60 are preferably utilized as described above; for example, the bosses 52 can be used for attaching the cabinet 50 to already existing fence posts, and the screw holes 58 and 60 of a plurality of cabinets 50 can be aligned and bolted together to enable the cabinets 50 to be stacked together to form a post of any desired length.

Figure 4:
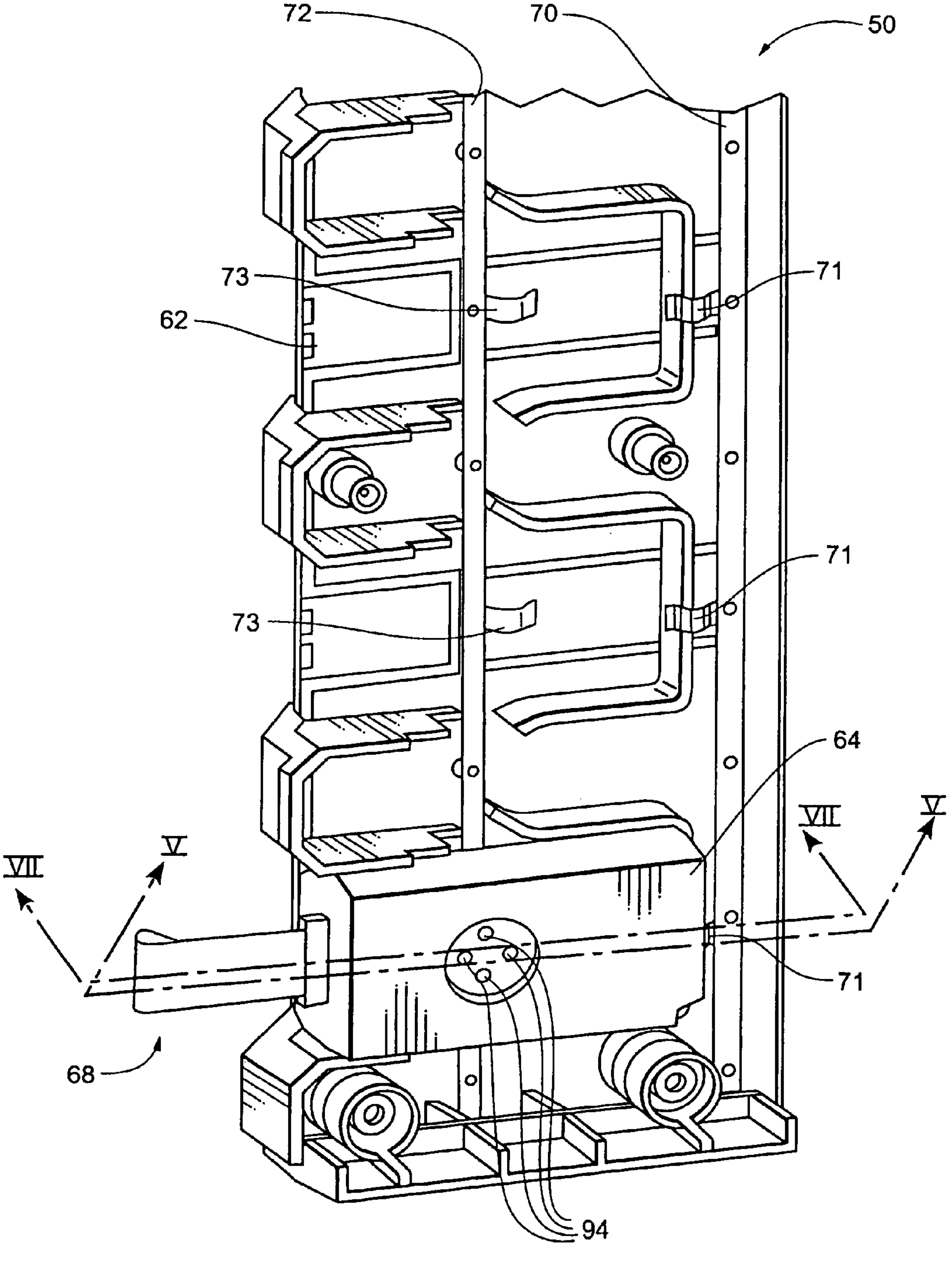
FIG. 4 is a computer aided drawing illustrating a schematic side cross sectional view of the alternate cabinet and a schematic side perspective view of a deflection sensing mechanism in accordance with certain embodiments of the invention.

Each cabinet 50 defines one or more channels 62 (shown in FIG. 4). In certain embodiments, each cabinet 50 has four channels 62, with adjacent channels 62 being spaced three inches apart. Preferably, the channels 62 are used to hold cartridges 64 therein. While each cabinet 50 may have a plurality of channels 62, all of the channels 62 may not be used. In these scenarios, such unused channels 66 (as shown in FIG. 3) would be selectively blocked during manufacturing. As such, these unused channels 66 would be covered by the cabinet surfaces. This nonuse may be done for a variety of reasons, for instance, to correspond to the appropriate spacing of the fencing wire strands 26 (shown in FIG. 7).

FIG. 4 illustrates a cross sectional view of the cabinet 50 showing one cartridge 64 in a corresponding internal channel 62. The cartridge 64 is used to retain a deflection bar 68, which extends out from the cartridge 64 (and the cabinet 50) in a generally perpendicular orientation. The deflection bar 68 is constructed of a metallic material to provide for vandal resistance. In certain embodiments, the length of the deflection bar 68 protruding outside the cabinet 50 is preferably at least about four inches, perhaps more preferably at least about eight inches, and perhaps optimally at least about twelve inches. The cartridge 64 also is located proximate to first and second bus bars 70 and 72 used to electrically connect the cartridges 64 and the cabinets 50 of the post together.

In certain embodiments, as illustrated, the first bus bar 70 is proximate to the rear of the cabinet 50. As such, the first bus bar 70 is referenced herein as the rear bus bar, but the invention should not limited as such. In certain embodiments of the invention, the rear bus bar 70 is electrically charged. A second bus bar 72 is also included in the system. In certain embodiments, as illustrated, the second bus bar 72 is proximate to the side of the cabinet 50. As such, the second bus bar 72 is referenced herein as the side bus bar, but the invention should not limited as such. The side bus bar 72 is electrically grounded, and as such, can provide a ground reference for the rear bus bar 70.

Figure 5:
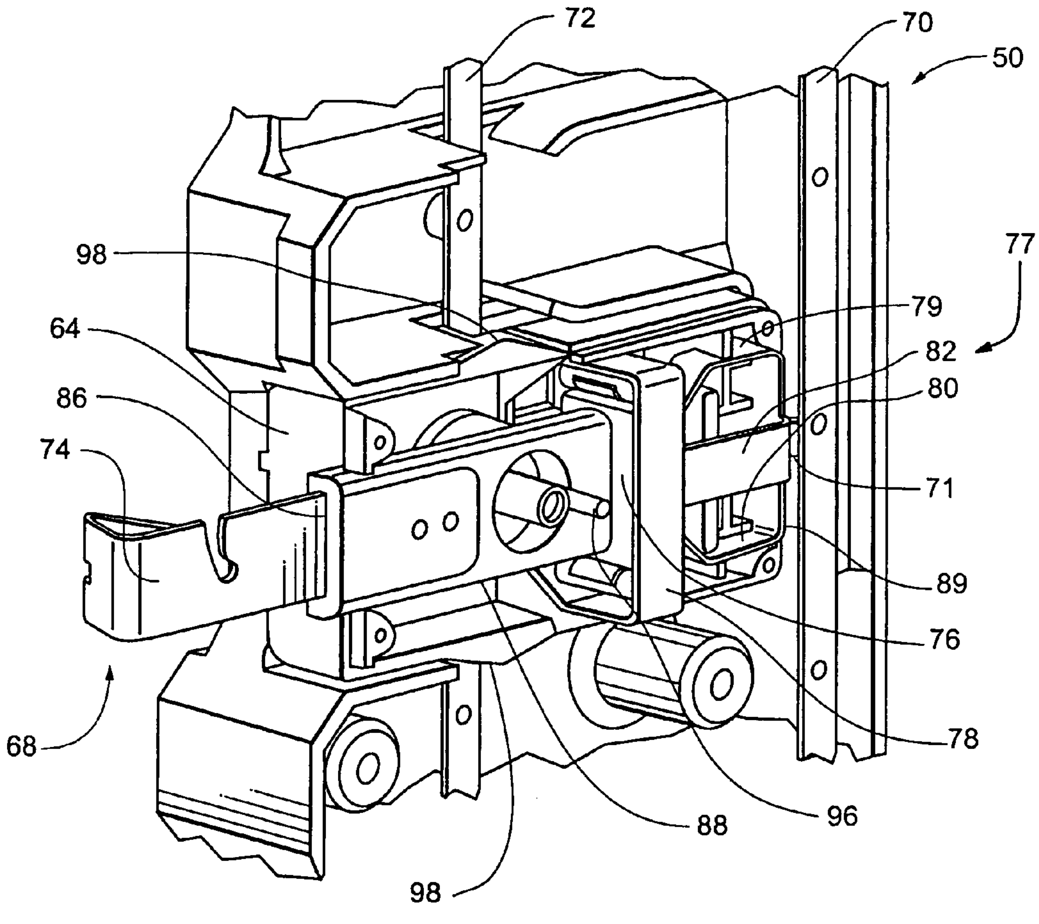
FIG. 5 is a computer aided drawing illustrating a schematic side cross sectional view of the deflection sensing mechanism of FIG. 4 in the alternate cabinet.
Figure 6:
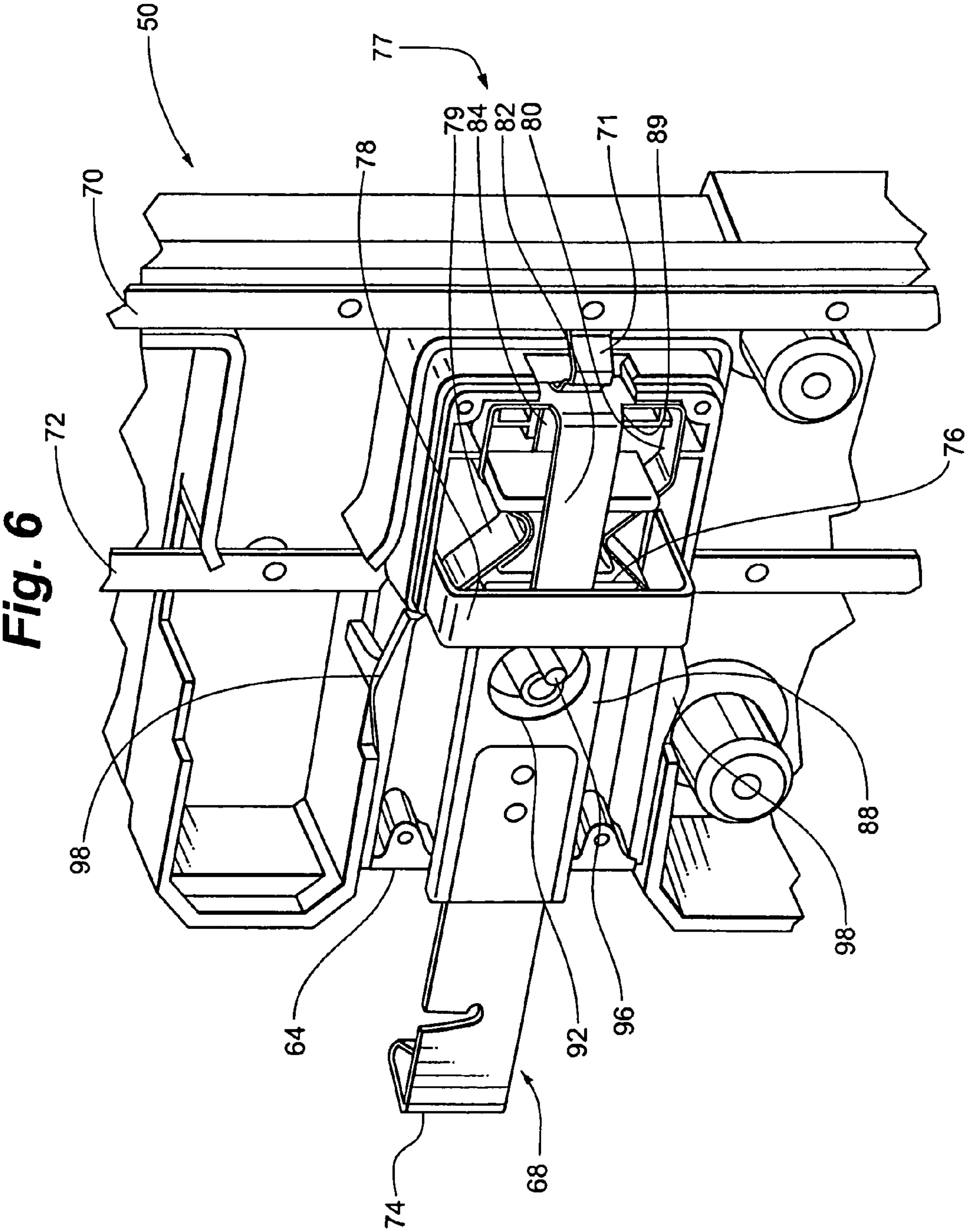
FIG. 6 is a computer aided drawing illustrating another schematic side cross sectional view of the deflection sensing mechanism of FIG. 4 in the alternate cabinet.

A cross sectional view of the cabinet 50 and the cartridge 64 is illustrated in both FIGS. 5 and 6. As depicted, the deflection bar 68 has an arm portion 74 protruding from the cartridge 64 and a contact portion 76 within the cartridge 64. As illustrated, each cartridge 64 also includes a spring contact 77 and a ring contact 78. The spring contact 77 is formed of four bent arm pieces; an upper piece 79, a lower piece 80, and two side pieces 82 and 84 (84 not being visibly shown in FIG. 5). Each cartridge 64 includes two housing halves, which conjunctively support the deflection bar 68 and enclose the deflection bar contact portion 76, the spring contact 77, and the ring contact 78. Each cartridge 64 has an opening 86 to allow the deflection bar arm portion 74 to extend outward from the cartridge 64. In addition, the cartridge 64 has apertures to allow the spring contact 77 and ring contact 78 to operatively couple to the rear and side bus bars 70 and 72, respectively, via respective protrusions 71 and 73 (discussed below).

Figure 7:
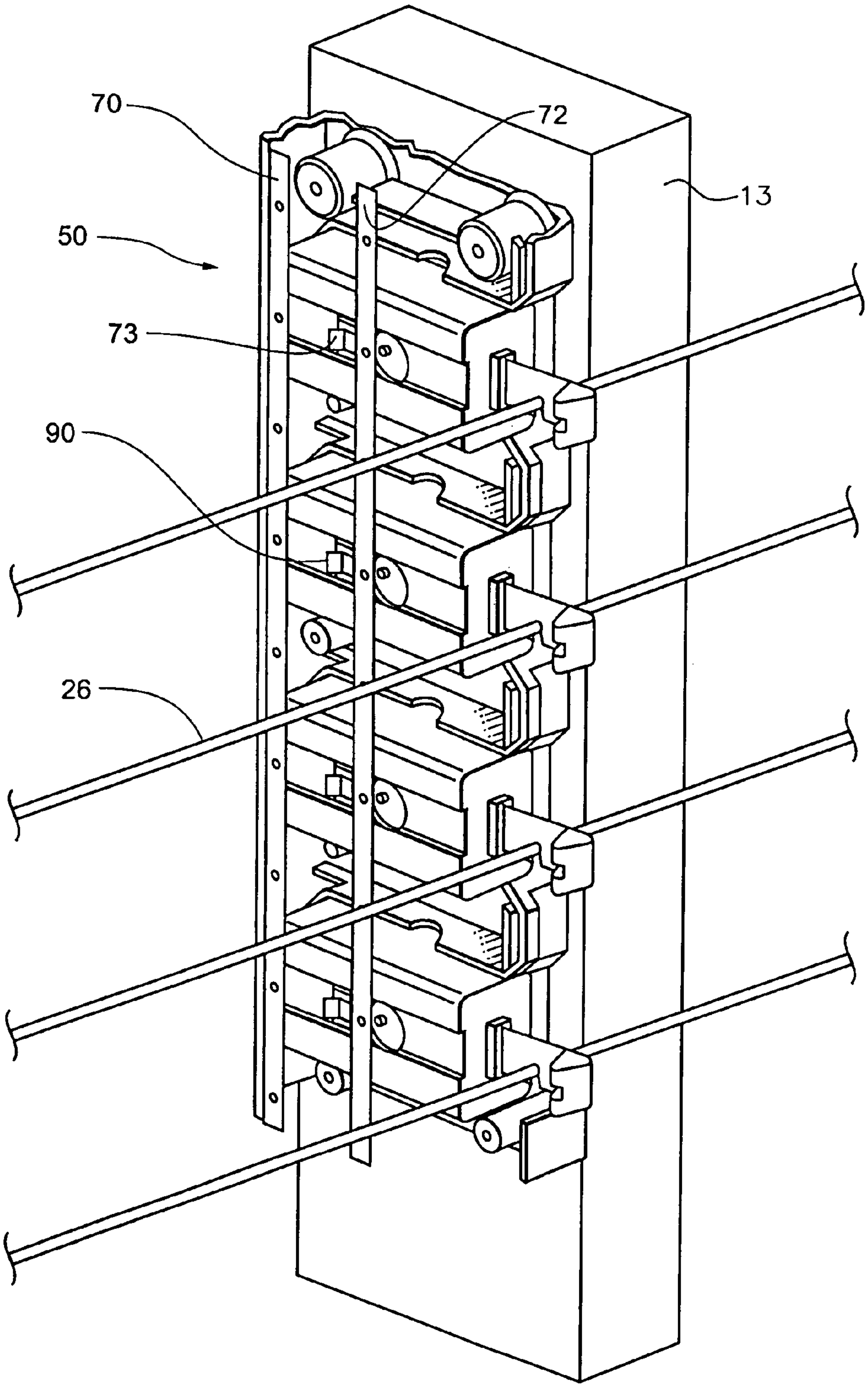
FIG. 7 is a computer aided drawing illustrating a schematic side cross sectional view of the alternate cabinet in accordance with other certain embodiments of the invention.

As described above, the deflection bar arm portion 74 extends outward from the cartridge 64 and is generally used to retain a strand of fencing wire 26 (shown in FIG. 7). In reference to the above-described embodiments, the deflection bar arm portion 70, the deflection bar contact portion 76, the spring contact 77, the ring contact 78, the rear bus bar 70, and the side bus bar 72 are all made from a conductive, corrosion-resistant metallic material (e.g., brass). As illustrated, a non-conductive collar 88 interconnects the arm portion 74 and the contact portion 76 of the deflection arm 68. The collar 88 is made from an insulating material (e.g., plastic) in order to electrically isolate the fence wire strand 26 from any electrical charge that comes in contact with the deflection bar contact portion 76. As such, the collar 88 also provides isolation for the deflection bar contact portion 76 from any voltage that may be placed on the wire strand 26. In addition, the rear and side bus bars 70, 72 are referenced as such because of their function as electrical conductors. They should not be identified as or confused with data communication buses, or the functioning of data communication buses.

The cartridge 64, and in particular, the opening 86, serves as a pivot point and guide for the deflection bar 68. As mentioned above, the spring contact 77 includes four bent pieces 79, 80, 82, and 84 (84 not visibly shown in FIG. 5). These spring bent arm pieces all connect to a metal segment 89 that is operatively coupled to the rear bus bar 70. The general orientation of these spring bent arm pieces is determined by locating slots in the cartridge housings. A function of the spring bent arm pieces 79, 80, 82, and 84 is to hold the deflection bar contact portion 76 in a neutral or rest position so that no contact is made between the spring contact 77 and the ring contact 78. The ring contact 78 is clipped into one of the cartridge housing halves and has a portion 90 that extends outside of the cartridge 64 and contacts the side bus bar 72 (FIG. 7) via the protrusion 73. As such, given sufficient movement of the wire strand 26 in any direction (e.g., in/out, up/down, side/side), the corresponding deflection bar 68 that accommodates the deflected wire strand 26 (via the deflection bar arm portion 74) will subsequently pivot. If the wire strand 26 is sufficiently deflected, the deflection bar contact portion 76 will in turn pivot and move the spring contact 77 (by one of the spring bent arm pieces 79, 80, 82, or 84) into the ring contact 78, and complete an electrical circuit between the rear and side bus bars 70, 72 so as to cause an alarm condition.

In other embodiments of the invention, the side bus bar 72 may be electrically charged, while the rear bus bar 70 provides the ground reference. It is irrelevant which bus bar 70 or 72 is electrically charged as long as the other bus bar provides the appropriate ground reference. Also, the detection level of the system could be varied by replacing the spring bent arm pieces 79, 80, 82, or 84. For example, if the detection level needed to be reduced (i.e., allowing a lesser deflection of the wire strand 26 to cause an alarm condition), the spring bent arm pieces could be replaced by spring bent arm pieces being less rigid which would enable easier pivoting of the deflection bar contact portion 76 and subsequent signaling of the alarm condition. In contrast, if the detection level needed to be increased (i.e., requiring a greater deflection of the wire strand 26 to cause an alarm condition), the spring bent arm pieces could be replaced by spring bent arm pieces being more rigid which would create more resistance to movement of the deflection bar contact portion 76 and subsequent signaling of the alarm condition. In certain embodiments, the deflection bar 68 is constructed (e.g., without the collar 88) such that the user has the option to electrically charge the wire array.

The cartridge 64 is configured for selectively preventing an alarm in any direction the user may choose. As illustrated in FIGS. 4, 5, and 6, the collar 88 defines a hole 92 that aligns with a series of four bores 94 in one or more of the cartridge housing halves. Placing one or more pins (conductive or nonconductive) 96 in one of these holes 94 (through both housing halves) prevents the deflection bar contact portion 76 from moving in one or both of the vertical or horizontal planes. This in turn, prevents deflection of the spring contact 77 and closing of the electrical circuit (and subsequent actuation of an alarm condition). This feature allows the user to prevent alarms, e.g., due to misalignment of adjacent posts (corners, hills, valleys, etc).

The cartridge 64 is designed to be configured for sensitivity prior to installation into the cabinet 50. Once configured, the user attaches the deflection bar 68 to the wire array by sliding the wire strand 26 into the beveled portion of the deflection bar 68, aligning the wire strand 26 with the wire channel and turning the cartridge 64 ninety degrees (e.g., ¼ turn) counter-clockwise. Removal requires reversing these steps. The cartridge 64 is then inserted into the cabinet 50 until retaining latches 98 (FIGS. 5 and 6) within the cabinet 50 are engaged. This step causes the spring contact 77 and ring contact 78 in the cartridge 64 to make electrical contact with corresponding bus bars 70, 72 proximate to the cabinet 50. Removal of the cartridge 64 is facilitated by a tool that is inserted through the front of the cabinet 50 and releases the holding latches 98. The requirement for a specific tool to release the cartridge 64 makes the invention tamper resistant.

As mentioned above, the cabinets 50 can be stacked to form a post to fit various wire array heights. As such, the cabinets 50 are stacked and then bolted together through the top and bottom screw holes 58, 60. The bus bars 70 and 72 are designed to provide electrical contact between adjacent cabinets 50 when joined. In certain embodiments, the post has caps on both the top and bottom to prevent contamination and house electrical connections running into and out of the posts. The top cap houses electronics which are connected to the cabinet bus bars 70 and 72. If any deflection bar 68 of any cartridge 64 mounted in the cabinet 50 is deflected enough to cause electrical contact between any of the spring contact 77 and the ring contact 78, then the electronics in the top cap will send an electrical signal to an alarm monitoring system. Likewise, a similar configuration having top and bottom caps can be applied to the cabinets 10 of FIGS. 1 and 2.

As is detailed herein, this electrical system is highly flexible and allows for a wide range of sophistication in the alarm monitoring system. In simple, low cost systems, the electrical signal will activate a light or siren attached to the one or more cabinets 50 (or 10) forming a post. In other systems, multiple posts are linked together to form a group or zone. In this case, the electrical signal, generated by any cabinet 50 (or 10) in the group, can be delivered to an alarm monitoring system which can report the status of the zone to the user. In more sophisticated systems, the electrical signal can contain a digital code representing an individual cabinet 50 (or 10). When such cabinets 50 (or 10), or posts formed from a plurality of cabinets 50 (or 10), are linked together with individual identification codes, the alarm monitoring system is capable of reporting to the user the status of individual cabinets 50 (or 10) or posts in the zone.

The electrical link between posts is accomplished with either hardwired interconnects or wirelessly with rf (radio frequency) transceivers. External fasteners used in a hardwired system are water-proof and tamper resistant. All conductive internal parts are preferably selected to be made of corrosion resistant material (typically metal), and all external fasteners are preferably selected to be tamper resistant.

In accordance with certain embodiments of the invention, once one of the wire strands 26 is deflected, meeting a certain deflection level so that an alarm condition is triggered, two things occur. First, a response is generated by the deflection. This response can consist of an alarm being activated (preferably, being audible or visible) and/or an electrical shock being distributed via the wire strand that was deflected. Second, the event is preferably communicated to a security system from the fence post that accommodates the deflected wire strand 26. With this communication, many actions will preferably follow, which are generalized here, but will be described in detail below. For instance, with the aid of the security system, the location of the perimeter breach (i.e., the location of the wire strand deflection) is isolated within a certain distance of the occurrence. Optimally, the distance would be ten feet or less (i.e., corresponding to the spacing of the fence posts in the fence system). In turn, central security can be alerted and security cameras can be focused on the area of the perimeter breach for visual inspection. Additionally, warning lights may be used to illuminate the breached area to further aid in quickly identifying the cause of the perimeter breach.

As described above, the security system is alerted from the fence post if any one of its accommodated wire strands 26 is sufficiently deflected, which causes the electrical contact between the bus bars with the cabinet. In certain embodiments of the invention, this deflection occurs when a force of at least about ten pounds is vertically exerted on the wire strand 26, and occurs when a force of at least about five pounds is horizontally exerted on the wire strand 26. In certain embodiments, the system is connected to an alarm monitoring system, in which alarm conditions are indicated in the alarm system by causing sufficient wire strand deflection. Thus, the deflection of the wire strands 26 is a trigger to the security system being alerted. However, it is contemplated that this activation trigger (caused by deflection) could also be combined with a variety of other activation triggers to meet even higher intrusion detection standards for the security system.

One such activation trigger may include a pair of photo beam sensors, which are set off if two photoelectric beams transmitted therebetween are interrupted simultaneously. Such sensors are commercially available from Pulnix Sensors, Inc. (Sunnyvale, Calif., U.S.A.). The sensors are preferably constructed of heavy-duty, impact resistant plastic (to provide for vandal resistance), and utilize synchronized twin beams, which are not easily susceptible to nuisance alarms. The sensors are generally mounted on top of the fence post, however, they could be mounted anywhere along the fence post just as well.

Preferably, the photo beam sensors incorporate side aiming with a 180 degree rotary optical system, which eliminates the need for the sensors to be mounted face to face. The sensors also include a mechanism for adjusting the sensitivity of the beams. In attempting to prevent false alarms, the sensor functions with an external light compensation circuit for filtering excess light (e.g., sunlight, automobile headlights, other light sources). Additionally, a hood is included on the sensor that prevents beam interruption due to frost or dew. Further, a rubber grommet is also preferably incorporated with each sensor to prevent insects from entering the sensor via the power supply wiring inlets. In certain embodiments of the invention, outdoor protection distances of 330 feet can be obtained from such photo beam sensors with response times ranging from 50 to 700 milliseconds.

Another activation trigger may include sensor cable. Preferably, the cable comprises piezoelectric sensor cable. Piezoelectric cable functions by sensing mechanical energy (e.g., direct impact or motion proximate to the cable), and generating piezoelectricity within the cable as a response. Such sensor cable is commercially available from Fiber Sensys, Inc. (Beaverton, Oreg., U.S.A.). In use, the sensor cable generally is strung from post to post, and includes male and female connection ends. The cable is sensitive, yet rugged and durable, and can be fabricated in great lengths. In certain embodiments of the invention, an advanced digital signal processing (DSP) algorithm is programmed within a control module for the cable, which would differentiate cutting, climbing, and lifting of the fence wire strands from other nuisances. Additionally, the sensor is preferably incorporated with filters and algorithms to reject rain, snow, hail, lightning, and road or rail traffic as nuisances. Further, the sensor is optimized for exceptional sensitivity during high winds.

As described above, the deflection of the fence preferably creates an immediate response from the deflected fence strand 26. This response is based on what has been configured with the security system. Preferably, one or more response modes will be selected ahead of time (i.e., upon installation) in order for the system to provide the immediate response to the deflection. The response modes preferably include any combination of "alarm only", "low voltage", or "non-lethal electric fence" (NLEF). As such, the response generated will be based on the response mode selected. Further, it is contemplated that a deterrence level for each response mode may also be set. For example, if the NLEF response mode were selected, high voltage pulses would be delivered and could be varied in magnitude, for example, from 5,000 volts up to 8,000 volts, based upon what is set for the deterrence level. Another example could involve any of the modes in which the intensity of the alarm (e.g., auditory, visual intensity) may be varied based upon the discretion of the user.

In summary, the response modes would preferably include "alarm only", "low voltage", and NLEF. All the response modes would be triggered given sufficient deflection of any of the wire strand 26 to cause the bus bars 40 and 42 (or 70 and 72) to come into electrical contact with one another. The "alarm only" response mode has no voltage on the wire strand and activates the alarm in the case of the alarm condition. As is detailed below, the "low voltage" response mode can detect when the wire strand is cut, grounded, or touching an adjacent wire, and also activates the alarm in the case of the alarm condition. Like the "low voltage" response mode, the NLEF response mode detects that the wire strand is cut, grounded, or touches an adjacent wire, however, the NLEF response mode also detects a grounded intruder/escapee touching the wire while standing or touching two adjacent wires simultaneously, as is also detailed below. The NLEF response mode creates short duration high voltage pulses over a particular frequency for deterrence, and may activate the alarm as well in the case of the alarm condition. Preferably, the duration of the pulses is less than three milliseconds, the voltage of the pulses is between 5,000 and 8,000 volts, and the frequency of the pulses is one second. Optimally, any electric shock distributed from any of the voltage pulses, while painful, would preferably not permanently injure animals or humans, and would preferably not interfere with pacemakers.

In certain embodiments of the invention, based on the threat level or time of day, the response mode and the deterrence level could be varied manually, automatically, or remotely to respond accordingly. In certain preferable embodiments of the invention, the same response mode can be used for the entire array of wire strands on the fence system. In contrast, different response modes can be used simultaneously for different wire strands on the fence system. Additionally, different response modes can be used simultaneously for different fence sections on the fence system. These areas incorporating varieties of response modes on different wire strands or different fence sections are preferably referred to as zones. The ability to divide and monitor the response modes across the perimeter fence in these above-mentioned fashions is facilitated by the security system of the invention, which is detailed below.

As described above, once the fence post detects the wire strand deflection, the event is communicated to the security system. In certain embodiments of the invention, the communication between the fence post and the security system is preferably done over a network. The network may be any communications network. For example, the network may include hard-wired electrical or optical communication links, wireless links, or a combination of both. In particular, the fence post may preferably include a communication interface that establishes a communication link with a communication interface in the security system over the network. As such, signals from the fence post and responses from the security system can be communicated over the network. In certain embodiments of the invention, the security system of the invention includes one or more control cabinets and one or more alarm monitors, as discussed below.

The control cabinet contains circuitry that performs numerous functions in the security system. The cabinet generally acts as an intermediary between the fence system and the alarm monitor, and is preferably kept within 300 feet of the fence system. The control cabinet and its components are commercially available from G.M. Advanced Fencing & Security Technologies, Ltd. (Kfar Saba Industrial Area, Israel). The cabinet components include one or more electric fence controllers, one or more monitor cards, a communications module, and a battery back-up power supply. Of course, other components and supporting circuitry are connected to the above components to aid in their function, as is well-known in the art, however, the components mentioned above are merely those relevant to the preferred embodiment.

One function of the control cabinet circuitry is providing the response modes to the fence system. For example, generally one of the electric fence controllers is used for providing the high voltage pulses to the wire strands having the NLEF response mode selected thereon. The controller is AC powered, and is generally coupled to the individual wire strands of the fence system through a terminal wiring strip. In the case of power failure, the battery back-up will be used to provide power to the controllers.

Another function of the control cabinet circuitry is monitoring the fence system. For example, the cabinet contains one or more monitor cards that, via a digital processor and the communications module, function in monitoring the voltage on the wire strands of the fence system for both the "low voltage" and NLEF response modes. In certain preferable embodiments of the invention, the control cabinet would contain two monitor cards, one for monitoring the wire strands having the "low voltage" response mode selected thereon, and one for monitoring the wire strands having the NLEF response mode selected thereon. In particular, software is preferably downloaded and utilized with the processor and the cards in monitoring voltage across the corresponding wire strands. In certain embodiments of the invention, each voltage output pulse would be compared with the prior pulse, and an alarm would be activated after two consecutive, significant voltage drops. Additionally, a method of adapting to gradual voltage drops caused by periodic contact with vegetation would be provided for. The low voltage monitoring card would preferably have the capacity for covering up to four low voltage zones, while the NLEF monitoring card would preferably have capacity for covering up to two high voltage zones.

In certain embodiments, upon the alarm condition, the control cabinet additionally functions in identifying the location of the event or breach. This may be accomplished by having each fence post digitally encoded, thereby integrating the posts with the security system. As such, when the alarm condition is transmitted to the cabinet, the post may be immediately identified. Another way of accomplishing this may involve operatively coupling the rear or side bus bars 40 or 42 (or 70 or 72) from one or more fence posts (i.e., and thus, forming a zone), such that when an alarm condition (i.e., following a wire strand deflection) occurs, the event can be isolated by identifying in which zone the event occurred.

Further, the cabinet functions in switching between response modes. The switching can be manual, automatic, or by remote control. If the switching is automatic, it can be dictated by a time schedule (programmed by the user), or by the actual alarm condition. For instance, in the case of the alarm condition, the response mode may be switched from "alarm only" to NLEF to enhance security over the fence system. If the switching is by remote, a modem may additionally be included in the cabinet for providing communication over the internet.

The alarm monitor also has numerous functions in the security system, however, its primary function involves communicating the status of the fence system to the user or security staff. As such, the alarm monitor is operatively coupled to the control cabinet. Preferably, the alarm monitor is an alarm monitoring integration system (AMIS), commercially available from Zareba Security (Ellendale, Minn., U.S.A.). The AMIS is operatively coupled to a color graphic video monitor that allows security personnel to monitor and react to any changes in the fence system conditions. Preferably, the video monitor incorporates touch screen technology with color photographs and engineered drawings of the property to enhance the monitoring. In use, digital data is communicated over fiber optic cabling to provide secure, interference-free, reliable communication between the monitor and the controller cabinet.

The fence system of the present invention thus combines a barrier, an intrusion sensor, and/or a shock deterrent to effectively deter, detect, and/or delay intruders/escapees from attempting to breach security. Using the embodiments of the apparatus and methods described herein, the present invention provides a cost effective manner of doing such. While a preferred embodiment of the present invention has been described, it should be understood that various changes, adaptations, and modifications may be made therein without departing from the spirit of the invention and the scope of the appended claims.

What is claimed is:

1. A fencing system including a plurality of spaced posts joined by fencing wire for providing perimeter security comprising:

(a) at least one post having one or more cabinets;

(b) one or more strands of said fencing wire operatively coupled to said at least one post, the one or more strands of fencing wire operatively connecting the at least one post to other posts of said plurality of spaced posts in the fencing system;

(c) a sensing mechanism being held by a cartridge, a first member of the sensing mechanism protruding from the cartridge, the first member operatively coupled to one fencing wire strand of the one or more, strands of fencing wire, the sensing mechanism configured to trigger an alarm condition if the one fencing wire strand coupled to the first member is deflected with a sufficient amount of force, the cartridge being releasably held within a channel of one cabinet of said one or more cabinets, the channel having a size which mates with the cartridge in order to enable both slidable removal and slidable insertion of the cartridge with respect to the channel; and (d) a first bus bar and a second bus bar located proximate to the sensing mechanism, said first bus bar and said second bus bar being retained, by the one cabinet so as to make contact with distinct electrically conductive elements of the cartridge upon insertion of the cartridge within the channel.

2. The fencing system of claim 1 wherein the sensing mechanism includes a second member operatively coupled to the first member, the second member located within the cartridge, wherein deflection of the one fencing wire strand with the sufficient amount of force results in movement of the first member and corresponding movement of the second member, the corresponding movement of the second member resulting in contact between one or more of the distinct electrically conductive elements and the second member, thereby triggering the alarm condition.

3. The fencing system of claim 1 wherein the sensing mechanism includes a second member operatively coupled to the first member, the second member located within the cartridge, wherein deflection of the one fencing wire strand with the sufficient amount of force results in movement of the first member and corresponding movement of the second member, the corresponding movement of the second member resulting in the triggering of the alarm condition, and the first member and the second member being operatively coupled via a collar.

4. The fencing system of claim 3 further comprising one or more pins, said collar having a central bore sized to accept said one or more pins therethrough, the one or more pins limiting the corresponding movement of the second member resulting from deflection of the one fencing wire strand.

5. The fencing system of claim 4 wherein the one or more pins are held in place via the cartridge for the sensing mechanism, and wherein each of the one or more pins limits the corresponding movement of the second member in one or more of a vertical direction and a horizontal direction, thereby limiting potential of the triggering of the alarm condition.

6. The fencing system of claim 3 wherein the collar is electrically insulative, thereby preventing electrical conduction between the first member and the second member.

7. The fencing system of claim 1, wherein the cartridge is releasably held within the one cabinet by at least two retaining latches on the cartridge.

8. A fencing system including a plurality of spaced posts joined by fencing wire for providing perimeter security comprising:

(a) at least one post including one or more cabinets;

(b) one or more strands of said fencing wire operatively coupled to said at least one post, the one or more strands of fencing wire operatively connecting the at least one post to other posts of said plurality of spaced posts in said fencing system;

(c) at least two sensing mechanisms each being held by a distinct cartridge, each sensing mechanism including a first member protruding from the corresponding distinct cartridge, each of the first members operatively coupled to distinct strands of the fencing wire, the sensing mechanisms each configured to individually trigger an alarm condition, the alarm condition triggered if one of the distinct strands of fencing wire coupled to the first members of the sensing mechanisms is deflected with a sufficient amount of force, the distinct cartridges each being releasably coupled with one cabinet of said one or more cabinets so as to enable both removal and enjoinment of the distinct cartridges with respect to the one cabinet; and (d) a first bus bar and a second bus bar located proximate to the sensing mechanisms, said first bus bar and said second bus bar being retained by the one cabinet so as to make contact with distinct electrically conductive elements of each of the distinct cartridges upon enjoinment of the distinct cartridges with the one cabinet.

9. The fencing system of claim 8 wherein each first member of the sensing mechanisms is operatively coupled to a second member, wherein deflection of one of the distinct fencing wire strands with the sufficient amount of force results in movement of the corresponding first member and in movement of the corresponding second member, the movement of the corresponding second member resulting in contact between one or more of the distinct electrically conducting elements of the corresponding distinct cartridge, thereby triggering the alarm condition.

10. The fencing system of claim 8 wherein each first member of the sensing mechanisms is operatively coupled to a second member, wherein deflection of one of the distinct fencing wire strands with the sufficient amount of force results in movement of the corresponding first member and in movement of the corresponding second member, the movement of the corresponding second member resulting in the triggering of the alarm condition, the first members and the second members of each sensing mechanism being operatively coupled via a collar.

11. The fencing system of claim 10 further comprising one or more pins, said collar having a central bore sized to accept said one or more pins therethrough, the one or more pins for each central bore limiting the movement of the corresponding second member resulting from deflection of the corresponding distinct fencing wire strand.

12. The fencing system of claim 10 wherein the collar is electrically insulative, thereby preventing electrical conduction from the first member to the second member.

13. The fencing system of claim 8, wherein each cartridge is held within the one cabinet by at least two retaining latches on each of the cartridges.

14. A method of providing perimeter security using a plurality of spaced posts joined by fencing wire comprising:

(a) positioning a post having one or more cabinets;

(b) operatively coupling one or more strands of fencing wire to said post so as to operatively connect said post to other posts of said plurality of spaced posts;

(c) providing a sensing mechanism, the sensing mechanism being held within a cartridge, the sensing mechanism including a first member protruding from the cartridge;

(d) operatively coupling the first member of the sensing mechanism to one fencing wire strand of the one or more strands of fencing wire; and (e) operatively coupling the sensing mechanism to one of the cabinets by sliding the cartridge within a channel of the one cabinet, a first bus bar and a second bus bar being retained by said cabinet so as to make contact with distinct electrically conductive elements of the cartridge upon insertion of the cartridge within the channel, the sensing mechanism configured to trigger an alarm condition if the one fencing wire strand is deflected with a sufficient amount of force.

15. The method of claim 14, wherein the channel has a size which mates with the cartridge in order to enable both slidable removal and slidable insertion of the cartridge with respect to the channel.

16. A fencing system including a plurality of spaced posts joined by fencing wire for providing perimeter security comprising:

(a) at least one post having one or more cabinets;

(b) one or more strands of said fencing wire operatively coupled to said at least one post, the one or more strands of fencing wire operatively connecting the at least one post to other posts of said plurality of spaced posts in the fencing system;

(c) a sensing mechanism being held by a cartridge, said sensing mechanism having a first member and a second member, said first member protruding from the cartridge and being operatively coupled to one fencing wire strand of the one or more strands of fencing wire, said second member being located within the cartridge and operatively coupled to the first member, the cartridge being releasably held within a channel of one of the cabinets, the channel having a size which mates with the cartridge in order to enable both slidable removal and slidable insertion of the cartridge with respect to the channel, said sensing mechanism configured to trigger an alarm condition if the one fencing wire strand coupled to the first member is deflected with a sufficient amount of force to create movement of the first member and corresponding movement of the second member, said corresponding movement of the second member resulting in the triggering of the alarm condition; and (d) said first member and the second member being operatively coupled via a collar and further including one or more pins, said collar having a central bore that is sized to accept said one or more pins therethrough, the one or more pins limiting the corresponding movement of the second member resulting from deflection of the one fencing wire strand.

17. The fencing system of claim 16 wherein the one or more pins are held in place via the cartridge for the sensing mechanism, and wherein each of the one or more pins limits the corresponding movement of the second member in one or more of a vertical direction and a horizontal direction, thereby limiting potential of the triggering of the alarm condition.

18. The fencing system of claim 16 wherein the collar is electrically insulative, thereby preventing electrical conduction from the first member to the second member.

* * * * *